Figure 1:
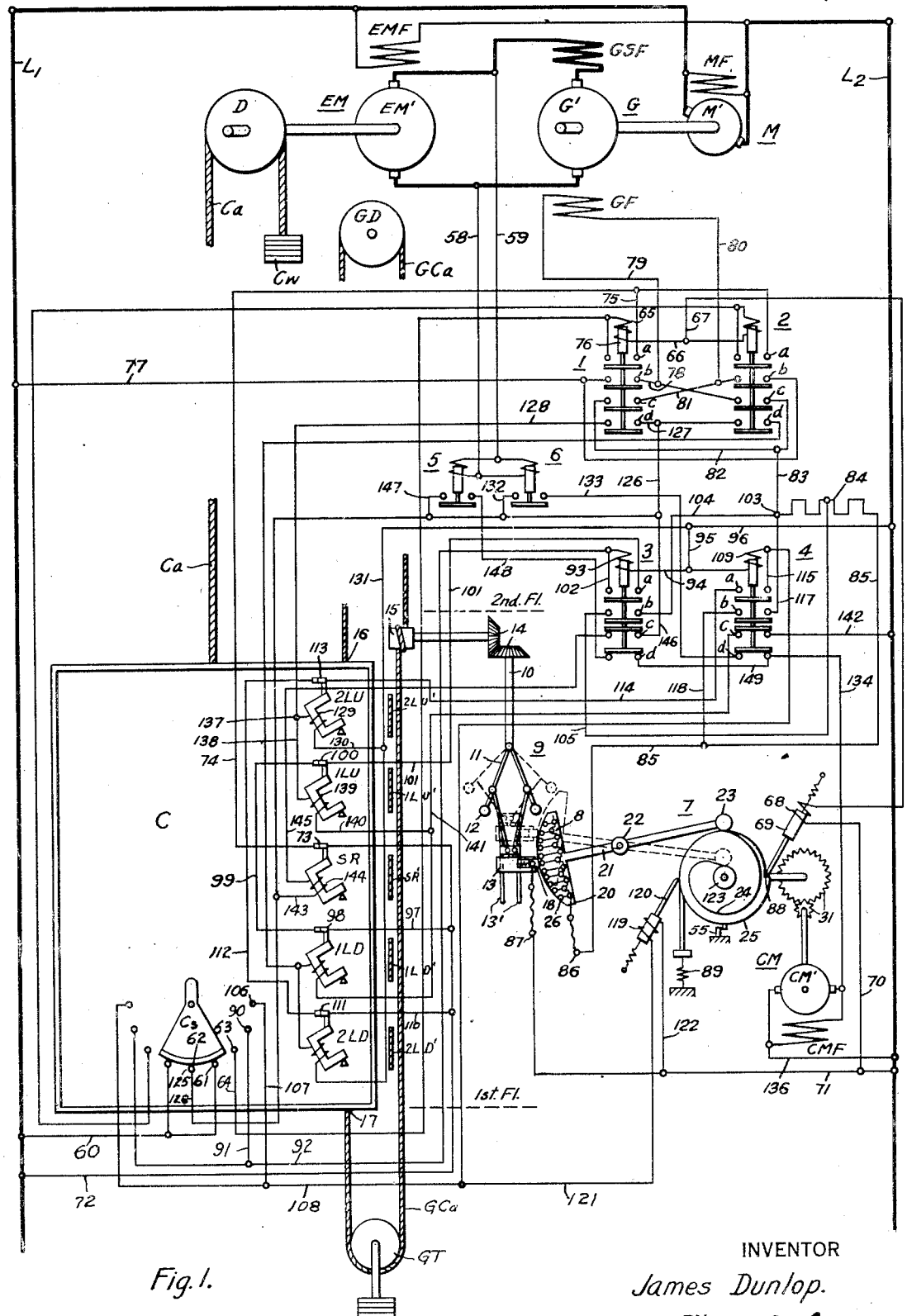

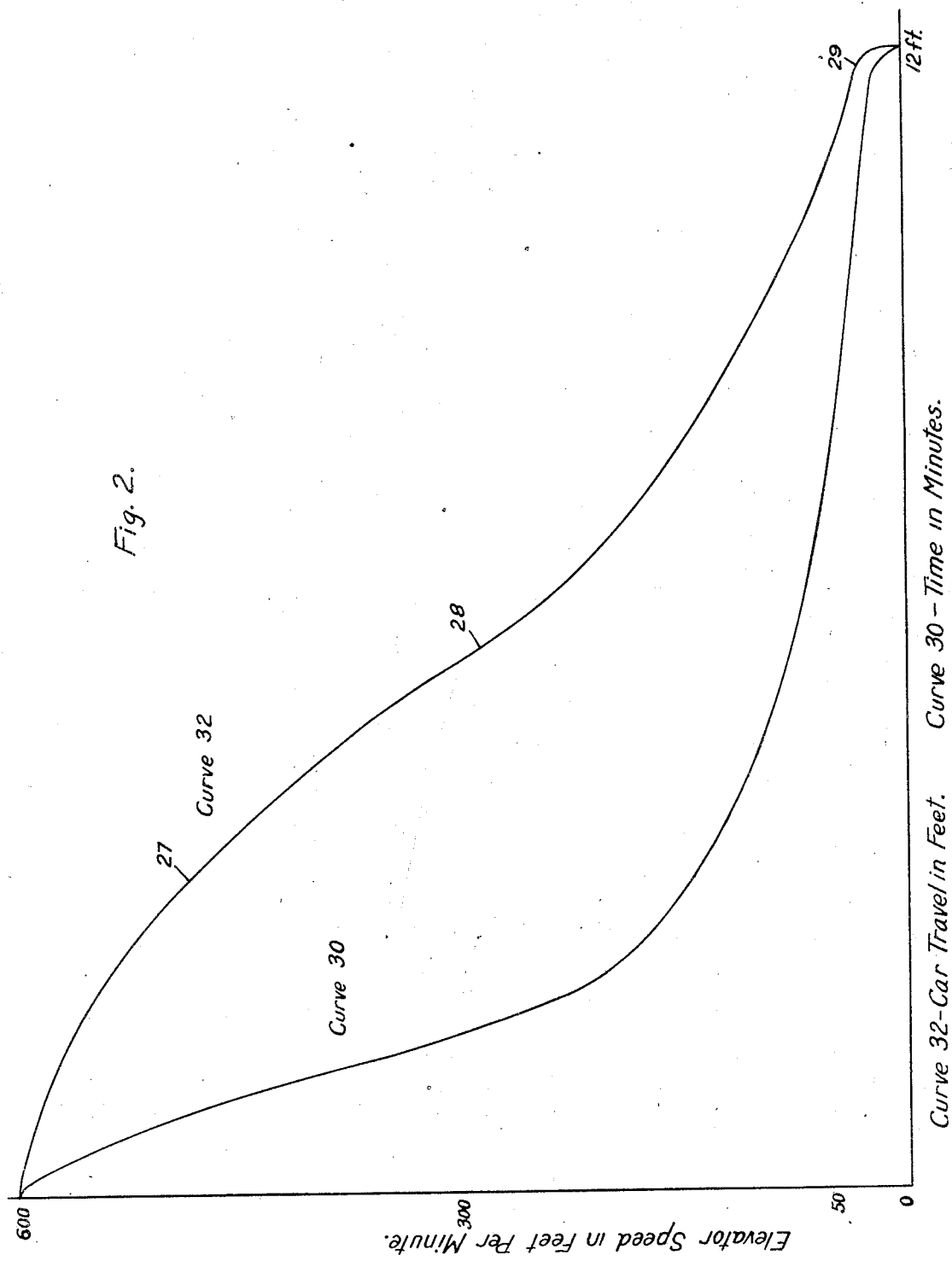

Patented June 25, 1935

2,005,890

UNITED STATES PATENT OFFICE 2,005,890

MOTOR CONTROL SYSTEM

James Dunlop, Park Ridge, Ill., assignor to Westinghouse Electric & Manufacturing Company, a corporation of Pennsylvania Application November 13, 1929, Serial No. 406,842

15 Claims. (Cl. 172—152)

My invention relates to systems of motor control, and more particularly to systems of motor control in which it is required that the speed of operation of the motor be independent, or nearly so, of the load being driven thereby.

In the prior art, much thought has been directed to the development of motor control systems whereby the speed of operation of a driving motor may be maintained at a constant value independent of the load thereon.

In the main, however, the effort has been to control the excitation of the motor under varying load conditions through means which are directly responsive to such variation in load. The most notable example of this type of development is, of course, the compound wound motor, in which an additional, or series, field winding disposed in series relation to the armature circuit and which, therefore, carries the total load current, is employed to vary the excitation of the motor in accordance with the load. Numerous refinements have been added to this type of motor, and, within certain limits, the regulation produced thereby has been highly satisfactory.

I propose, however, to vary the excitation of a motor in accordance with the "error in speed" which results from the variation of load or other conditions. Normally, it is true, a given variation in load will require a given variation in excitation if the speed is to be maintained constant. Under certain other conditions, however, this variation in excitation may be either too great or not great enough, and a variation in speed results. I propose, as stated above, to take advantage of this change in speed to further vary the excitation supplied the motor to thereby return the motor speed to its correct value.

In certain motor control applications, it may be desirable to obtain the entire variation in motor excitation through my invention, to be hereinafter described, while in others it may be more desirable to compound the motor in accordance with the principles of the prior art, and to employ my device to correct the minor variations in speed not compensated for by the usual compounding means.

A notable example of the latter class is that of the motors employed to drive elevators of the gearless traction type, in which precise motor regulation must be attained while running at, and decelerating from, high speeds under wide variations of loading.

In elevators of this type, it is customary to employ some form of automatic slow down and stopping means, which may be rendered effective either by the movement of the usual car switch, or which may be rendered effective by the operation of passenger operated call buttons in the car and at the floors served by the elevator. It is usual to employ one or more steps of deceleration prior to the shutting off of the power to the elevator motor and the setting of the brake.

It is of the greatest importance that, at the time the brake is set to bring the car to rest, the car be moving at a predetermined rate of speed, in order that the force of the brake may be sufficient to bring the car to rest accurately level with the particular floor landing.

The problem of motor control therefore assumes its greatest importance during the deceleration period, and the period just prior to the initiation of deceleration. The acceleration of the motor is less important, since it is only necessary that the rate of acceleration be not inconsistent with the comfort of the passengers.

The object of my invention, therefore, generally stated, is to provide a motor control system in which the speed of operation of the motor is independent of the load.

More particularly stated, the object of my invention is to provide a motor control system in which any variation from a predetermined speed, of the speed of operation of the motor, may be utilized to vary the excitation supplied the motor to thereby cause the motor speed to return to said predetermined value.

Specifically stated, the object of my invention is to provide a control system for motors, in which any departure from a predetermined rate of variation in the speed of the motor may be utilized to vary the excitation of the motor to thereby cause said rate of variation to assume said predetermined value.

My invention will be described with reference to the accompanying drawings in which, Figure 1 is a diagram of an elevator control system embodying my invention, and, Fig. 2 is a graphic representation of the change in speed of an elevator car, during deceleration, with respect to the distance traveled and with respect to the elapsed time.

Referring now to Fig. 1, I have provided a driving means for the elevator car of the variable voltage, or Ward-Leonard type, wherein a driving motor M, having an armature M', and a field winding MF connected in parallel relation thereto, receives power directly from the line conductors L1 and L2. The motor M drives a generator G, having an armature G', and being provided with a separately excited field winding GF and a cumulatively wound series field winding GSF. A hoisting motor EM has its armature EM' connected in a local circuit including the armature of the generator G and the generator series field winding GSF. The field winding EMF of the motor EM is connected directly across the line conductors L1 and L2, as shown. The elevator motor EM drives the elevator car C, at a rate determined by the value of voltage supplied its armature EM' by the generator G, through the hoisting drum D over which passes, in the usual manner, the cable Ca, one end of which is connected to the car C and the other end of which is connected to a suitable counter-weight Cw.

The speed and direction of rotation of the elevator motor EM is suitably controlled from the car C by means of the car switch Cs, which in turn controls the direction switches 1 and 2, and the accelerating relays 3 and 4, to thereby change the polarity and value of voltage supplied to the separately excited generator field winding GF. As will be obvious to those familiar with the art, the effect of the series field winding GSF is at all times a function of the load carried on the elevator car C, and its effect is sufficient, or nearly so, under normal conditions, to maintain the voltage of the generator G at such a value that the speed of the elevator motor EM is maintained at a predetermined value depending upon the excitation supplied the generator through the field winding GF.

As hereinbefore stated, precise motor control is of particular importance in connection with elevator systems of the type wherein the deceleration and stoppage of the elevator car at a selected floor is automatically accomplished through means which are under the control of either the operator of the car or of the passengers at the various floor levels. I have, therefore, illustrated my invention as embodied in a system in which the automatic slow-down and stopping means comprise inductor relays, for an illustration of which type of system reference may be had to the copending application of Edgar M. Bouton, Serial No. 731,921, filed August 24, 1924. As described therein, each of the inductor relays comprises a movable armature upon which is disposed a coil arranged for energization by operation of the car switch located on the car. Stationarily mounted in the hatchway adjacent the several floor levels are inductor plates which cooperate with, and cause movement of, the armature of the associated relay when the latter is brought adjacent thereto. Movement of the armature controls suitable contact members disposed in circuits, the interruption of which causes the deceleration and stopping of the car. For purposes of description, I have illustrated a system wherein two steps of acceleration and deceleration are provided for. Accordingly, inductor relays 2LU and 1LU are effective to cause deceleration of the car when moving in the up-direction, and relays 1LD and 2LD are effective to cause deceleration of the car when moving in the down-direction. The stopping inductor relay SR is effective to cause final stoppage of the elevator when moving in either direction. As will be hereinafter described, the coils of these inductor relays are suitably arranged for energization by proper movement of the car switch Cs. To cooperate with the inductor relays, I have provided the inductor plates 1LU', 2LU', 1LD', 2LD' and SR', one series of which is disposed in the hatchway adjacent each floor level. A primed character has been added to indicate the association of relays and plates.

As was stated in the description of the variable voltage control apparatus, the generator field windings GF and GSF are so proportioned that under normal conditions the speed of the motor may be made nearly independent of the load upon the elevator car, or of other varying conditions, and will depend only upon the degree of excitation supplied through the separately excited field winding GF. To compensate for the variations in speed, for which the normal compounding means are inadequate, I have provided a two-element regulating device to modify the excitation supplied the generator, through the field winding GF, by inserting varying portions of an auxiliary resistor into the circuit of this winding.

The regulating device comprises, first, an element 9 which moves, or is caused to operate, in accordance with the actual speed of movement of the elevator car, and second, an element 7 which is caused to move in accordance with a predetermined rate of movement of the elevator car. These two elements, as stated, cooperate to vary the portion of resistor 8 in the circuit of the separately excited generator field winding GF. As long as the speed of the elevator car corresponds to its predetermined speed, the value of resistor 8 in the circuit described is constant, since the two regulating elements maintain the same relative positions. However, if the speed of the car assumes a value other than the predetermined speed, a relative motion is imparted to the two regulating elements to thereby vary the value of resistor 8 in the generator field circuit by an amount sufficient to cause the actual speed of the car to return to the predetermined value.

A very convenient form of device responsive to the actual speed of a moving object, and one which I now consider to be a preferred form, comprises an ordinary fly-ball speed governor 9, having a rotating shaft 10 to which are pivotally fixed the arms 11 carrying the fly-balls 12. The inward or outward movement of the fly-balls 12 is transmitted to the member 13 as vertical movement. The governor 9 may be driven, for example, through suitable reduction gearing 14, by the drum 15, around which passes a governor cable GCa. As shown, the governor cable GCa passes over a suspension sheave GD and under a tension sheave GT, the ends being attached to the car at the points 16 and 17. The limits of movement of the member 13 may, of course, be determined directly from the design proportions of the fly-balls 12 and the arms 11, for any given speed limits of the elevator car C. Resiliently mounted on the element 13 for movement therewith is a conducting brush member 18, which may be connected to one side of the power source, as L2.

The remaining element of the regulating device shown collectively at 7 includes a member 20, which carries the auxiliary resistor 8 and which is arranged to provide the same limits of movement for resistor 8 as are provided for the brush member 18, the position of the resistor 8 with respect to its limits of movement being varied in accordance with a predetermined schedule. As shown, the member 20 is carried at one end of an arm 21, pivoted at 22, and carrying at its other end a roller 23. The roller 23 rides upon a cam surface 24 formed on the drum 25, which is in turn driven at a constant speed, under certain hereinafter described conditions, by the cam motor CM. The motor CM is illustrated as having its armature CM' and its field winding CMF connected in parallel relation.

A plurality of contact members 26 are arranged at different points along the resistor 8, and are disposed for engagement by the brush member 18, depending upon the relative position of the brush and the resistor. One terminal of the resistor 8 is connected to the separately excited field winding GF, in a manner to be hereinafter described. It will be apparent, therefore, that the amount of resistor 8 inserted in the generator field circuit will depend upon the relative positions of the brush member 18 and the resistor 8, which are in turn controlled by the speed of the car and the configuration of the cam surface 24, respectively.

The configuration of the cam surface 24 may be best understood with reference to Fig. 2 of the drawings in which I have illustrated, in curve 32, the variation in speed of an elevator with respect to the distance traveled after initiation of deceleration. As shown, the deceleration of the car is initiated at the point at which the curve 32 intercepts the ordinate, expressed in feet per minute, at which time the speed of the car is approximately 600 feet per minute. As also shown, the car is brought to rest at the point at which the curve 32 intercepts the abscissa, expressed in feet, which occurs when the car reaches a point approximately 12 feet in advance of the point at which deceleration is initiated.

From the standpoint of efficiency of the elevator system, it is desirable that the curve be as "steep" as possible, of course. From the standpoint of the comfort of the passengers, however, it is desirable that the curve be both gradual and regular. The configuration of the curve 32 is, therefore, determined in accordance with these two factors. I have noted on the curve the points 27 and 28, as being the points at which the automatic stopping means are successively effective to cause further deceleration of the car, and, the point 29 as indicating the rate of movement of the car at the time the motor circuits are finally interrupted and the usual brake caused to bring the car to rest. It will be apparent that it is highly important, when the car reaches the point 29, that its rate of movement be precisely the same for each slow-down operation.

As stated, I prefer to drive the drum 25 at a constant rate. In designing the cam surface, therefore, it is first necessary to transform the speed-distance curve, illustrated as curve 32, to a speed-time curve, illustrated as curve 30. This latter curve illustrates, as will be obvious to one familiar with the art, the speed at which the car should be moving at any definite time after deceleration is initiated, the ordinate being expressed in feet per minute as before, and the abscissa being expressed in minutes.

Knowing the characteristics of the speed device 9, it is possible to calculate the distance the brush member 18 thereof will move if the car decelerates from full speed to some predetermined lower speed. From the curve 30 it is possible to determine the time that should elapse while the car is decelerating to this extent. Therefore, these data, taken in conjunction with the known rate of movement of the drum 25, determine the configuration of the cam surface 24, since it is known that over a definite period of time, the cam surface should be such as to cause the arm 21 to change the position of the resistor 8 by an amount equal to the change in position of the brush member 18 on the speed device 9. Stated in another way, the curve 24, expressed in circular coordinates, is the equivalent of curve 30, expressed in rectangular coordinates.

By determining a number of such points, the complete configuration of the cam surface 24 is determinable. In the illustrated embodiment I have reduced the speed of the drum 25, through suitable reduction gearing 31, to such an extent that the drum makes one complete revolution while the car is decelerating from full speed to zero speed.

As will be obvious, when the car is stationary, the brush member 13 occupies its lowest position, when the car is started and accelerated to any predetermined speed, the brush member 18 rises a corresponding amount, and when the car is decelerated to zero speed, the brush member 18 returns to its original position again. The resistor 8 must, therefore, move through a corresponding cycle, and in substantial synchronism with brush member 18. If the car moves through this cycle at the prescribed rate, this movement will be in exact synchronism, of course.

As will be made more apparent in the course of the description, the cam motor CM is employed only for the purpose of revolving the drum 25 in a direction to cause the resistor 8 to move from a position corresponding to a running speed of the car, to the illustrated position. At the expiration of the slow down period, therefore, the motor CM may be disconnected from the line, to thereby conserve power. To accomplish this, I interpose a voltage relay in each of two circuits by way of which the motor CM may be operated. These relays are so proportioned that they are not actuated until the speed of the elevator reaches a predetermined value, but, having been actuated, are maintained in that condition until after the expiration of the slow down period. Their operation may best be understood in the description of an assumed elevator operation, hereinafter given.

I employ the spring 89 to cause the drum 25 to revolve from its illustrated position to a position corresponding to a running speed of the car. The strength of the spring is so proportioned as to cause the resistor 8 to rise in substantial synchronism with the brush member 13 when the latter rises in response to the acceleration of the car C.

In order that the resistor 8 may be maintained in its illustrated position while the car is stationary, I have provided the latching device 69, disposed to engage the latch portion 88 of the drum 25 when the latter is in its illustrated position. This device therefore restrains the spring 89, unless the coil 68 thereof is actuated to retract the core member, which action takes place only upon movement of the control devices to start the car.

As will be developed in the later discussion, it is at times desirable that the car shall be accelerated to only its intermediate speed. Under these conditions the brush member 13 will rise through only a portion of its complete path, and hence the movement of the resistor 8 should be similarly limited. To accomplish this I employ the additional latching device 120, disposed to engage the latch portion 88 of the drum 25 when the latter has rotated under the influence of spring 89, to such an extent as to cause the resistor 8 to rise to its predetermined limited position.

The operation of my system may best be understood with reference to an assumed operation.

Assuming that it is desired to move the car upwardly at high speed, the operator may move the car switch Cs to its extreme position in a counter-clockwise direction to complete circuits for the up-direction switch 1 and accelerating relays 3 and 4. The circuit for up-direction switch 1 extends from line conductor L1 through conductor 60, the contact members 61, 62 and 63 of the car switch Cs, conductors 64, the coil 65 of up-direction switch 1, conductors 66 and 67, the coil 68 of latching member 69, and conductors 70 and 71 to line conductor L2. The energization of the coil 65 actuates the armature of up-direction switch 1 to thereby close the contact members a, b, c and d.

The closing of contact members a completes a self-holding circuit for up-direction switch 1 which extends from line conductor L1 through conductor 72, the contact members 73 of stopping inductor relay SR, conductors 74 and 75, contact members a of up-direction switch 1, conductor 76 to the coil 65 and thence to line conductor L2, as previously described. Thereafter, the circuit of up-direction switch 1 is independent of the position of the car switch Cs, being under the control of the contact members 73 of the stopping inductor relay SR.

The closing of contact members b and c completes a circuit to the separately excited generator field winding GF which circuit extends from line conductor L1, through conductor 77, contact members b of up-direction switch 1, conductors 78 and 79, the separately excited field winding GF, conductors 80 and 81, contact members c of up-direction switch 1, conductors 82 and 83, resistor 84, conductor 85, the flexible conductor 86, a portion of the resistor 8, the contact brush 18, the flexible conductor 87 and conductor 71 to line conductor L2.

The generator now being supplied with excitation of a definite value, through the separately excited field winding GF, the generated voltage builds up to a value determined by such excitation, and causes the motor EM to rotate at its slow speed.

Movement of the car switch Cs to its first position also completes a circuit, it will be noted, to the coil 68 of latching member 69. This member is, therefore, retracted from its position of engagement with the latch portion 88 on drum 25 and permits this device to start moving in a counter-clockwise direction under the influence of the spring 89.

The circuit for intermediate speed accelerating relay 3 extends from line conductor L1 through conductor 60, contact members 61, 62 and 90 of car switch Cs, conductors 91 and 92, the coil 93 of relay 3 and conductors 94, 95 and 96 to line conductor L2. Relay 3 is, therefore, actuated to close its contact members a and b and to open its contact members c and d.

The closing of contact members a completes a self-holding circuit for relay 3 which extends from line conductor L1 through conductors 72 and 97, the contact members 98 of intermediate speed down-direction inductor relay 1LD, conductor 99, the contact members 100 of intermediate speed up-direction inductor relay 1LU, conductor 101, the contact members a of relay 3, conductor 102, the coil 93 of relay 3 and thence to line conductor L2, as previously described.

The closing of contact members b on relay 3 is effective to exclude a portion of resistor 84 from the circuit of the separately excited generator field winding GF, which circuit now extends, as previously described, to the point 103 on conductor 83 and thence through conductor 104, the contact members b of relay 3, conductor 105, a portion of the resistor 84 and thence to line conductor L2, as previously described. The additional excitation increases the generator voltage and thereby causes the elevator motor EM to accelerate to its intermediate speed.

The circuit for high speed accelerating relay 4 extends from line conductor L1 through conductor 60, the contact members 61, 62 and 106, conductors 107 and 108, the coil 109 of relay 4 and conductors 94, 95 and 96 to line conductor L2.

Relay 4 is, therefore, actuated to close its contact members a and b and to open its contact members c and d. The closing of contact members a completes a self-holding circuit for relay 4, which circuit extends from line conductor L1 through conductors 72 and 110, the contact members 111 of down-direction high speed inductor relay 2LD, conductor 112, the contact members 113 of high speed up-direction inductor relay 2LU, conductor 114, the contact members a of relay 4, conductor 115, the coil 109 of relay 4 and thence to line conductor L2, as previously described. The closing of contact members b of relay 4 is effective to exclude the remainder of resistor 84 from the circuit of the separately excited field winding GF, which circuit now extends from line conductor L1, as previously described, to the junction point 103 in conductor 83 and thence through conductor 117, the contact members b of relay 4, conductor 118, conductor 85, and thence to line conductor L2, as previously described.

By reason of the additional excitation now provided through the field winding GF, the generator G increases its voltage and thereby causes the elevator motor EM to accelerate to its full running speed.

Movement of the car switch Cs to its extreme position also completes a circuit to the coil 119 of latching device 120, which circuit extends from line conductor L1 through conductor 60, the contact members 61, 62 and 106 of car switch Cs, conductors 107, 108 and 121, the coil 119 of latching device 120, conductor 122, and thence to line conductor L2 by way of conductor 71. Now being energized, the coil 119 retracts the latching device 120 from a position of engagement with the latch portion 88 of drum 25, thereby permitting this latter element to continue to rotate until such a time as the roller 23 engages the cam surface 24 at the point 123, at which time the drum may be stopped in any convenient manner, as by a stop member 55.

As the car is accelerated from zero speed to its full running speed, the element 13 of the device 9 is caused to move upwardly at a rate determined by the rate of acceleration of the car C. In order that the brush 18 may remain in engagement with the same contact point of the resistor 8, it is apparent that the drum 25 should revolve at a rate such that resistor 8 is caused to rise at a rate equal to the normal accelerating rate of the car C. As stated, I accomplish this by employing the spring 89, which may be regulated to permit any desired rate of movement of the drum 25.

Accordingly, when the car attains its full running speed, the arm 21 carrying the resistor 8 is in the position shown by the dotted lines, the element 13 of the governor device is in its dotted line position and brush member 18 is in engagement with the resistor 8 at approximately its central point.

The position of resistor 8 then, is fixed as long as the full running circuits of the motor are maintained. The brush member 18, however, may have a slight up and down movement in accordance with variations in speed of the elevator motor EM. For example, if the motor attains a speed slightly in excess of its predetermined running speed, the brush member 13 rises slightly and inserts an additional portion of the resistor 8 in the circuit of the separately excited generator field winding GF, thereby causing the generator voltage to drop and decrease the speed of the elevator motor EM. Conversely, if the speed of the elevator drops below its predetermined value, the member 13 falls slightly, thereby decreasing the portion of resistor 8 in the circuit of the winding GF, and causes the motor to accelerate a proportional amount. If the value of resistor 8 is properly proportioned, a slight variation of the elevator motor speed from its predetermined running speed may be made to cause a sufficient variation in the resistance in the circuit of the winding GF to cause the generator voltage to vary enough to bring the motor speed back to, and slightly on the other side of, the predetermined speed. In this way the device 7 will operate similarly to voltage regulators of the vibrating type, usually applied to power systems. The variations, of course, may be made as small as desired by increasing the sensitivity of the regulating device 9.

If, now, it is desired to stop the car, the operator may center his car switch to thereby render the automatic stopping means effective for operation. Centering the car switch Cs completes a circuit to the coil of high speed up-direction inductor relay 2LU, which circuit extends from line conductor L1 through conductor 60, contact members 61, 62 and 125 of the car switch Cs, conductors 126 and 127, contact members d of up-direction switch 1, conductor 128, the coil 129 of inductor relay 2LU and conductors 130, 131, and 96 to line conductor L2. As the car in its movement up the shaft brings the inductor relay 2LU to a position opposite the associated inductor plate 2LU', the armature of the relay will be actuated to open the contact members 113. The opening of these contact members interrupts the circuit to the coil of accelerating relay 4, the consequent opening of which relay reinserts a portion of resistor 84 into the circuit of the field winding GF, thereby causing the elevator motor to decelerate.

The closing of contact members d of relay 4 completes a circuit to the cam motor CM, which circuit extends from line conductor L1 through conductor 60, the contact members 61, 62 and 125 of the car switch Cs, conductors 126 and 132, the now closed contact members of voltage relay 6, conductor 133, contact members d of relay 4, conductor 134, thence in parallel relation through the field winding CMF and armature CM', of motor CM, and conductor 136 to line conductor L2.

As stated, in the description of the apparatus, the voltage relay 6 is interposed in the cam motor circuit in order that it may interrupt this circuit while the car is stationary. The coil of relay 6 is shown as connected directly across the terminals of the generator G, by way of conductors 58 and 59 and the voltage supplied it is therefore proportional to the speed of the elevator motor EM. The coil is so designed that it will not actuate the relay unless the speed of the car is in excess of its intermediate speed, but will maintain the relay in the actuated position until the generator voltage drops to a very low value, which occurs after the expiration of the slow down period, or after the brake has been set. Since the car is running at its full speed, relay 6 is in the actuated position.

Being supplied with power the motor CM starts to rotate in a direction to drive the drum 25 in a clockwise direction to thereby raise the roller 23, as determined by the cam surface 24, and move the resistor 8 in a downward direction. As the car decelerates, the position of the member 13 will also be lowered. If the rate at which the deceleration of the car causes the member 13 to be lowered is equal to the rate at which the cam surface 24 causes the resistor 8 to be lowered, it will be apparent that the brush member 18 will remain in engagement with the resistor 8 at the same contact point. If, however, the car C decelerates at a greater or lower rate than that prescribed by the curves of Fig. 2, the brush 18 will move relatively to the resistor 8 and vary the generator voltage, and hence the motor speed, with the vibrating movement described above.

The closing of the contact member c of relay 4 completes a circuit to the coil of inductor relay 1LU, which circuit extends as described for the coil of inductor relay 2LU to the point 137, thence by way of conductor 138, the coil 139 of inductor relay 1LU, conductors 140 and 141, the contact members c of relay 4 and conductor 142 to line conductor L2.

As the car in its movement up the shaft brings the inductor relay 1LU to a position opposite its associated inductor plate 1LU', the armature of relay 1LU is actuated to open its contact members 100, thereby interrupting the circuit to the coil of relay 3 and causing this relay to open the contact members a and b and to close the contact members c and d. The opening of contact members b reinserts the remaining portion of resistor 84 into the circuit of the winding GF, thereby reducing the excitation of the generator and causing the elevator motor to further decelerate.

As described in connection with the first slowdown operation, the resistor 8 is further lowered under the influence of the roller 23, and the element 13 of the governor is lowered by reason of the deceleration of the car, the vibrating action being initiated if the relative positions of these elements vary.

The closing of contact members c of relay 3 completes a circuit for the coil of stopping inductor relay SR, which circuit extends from line conductor L1 through conductor 60, the contact members 61, 62 and 125 of car switch Cs, conductors 126 and 143, the coil 144 of inductor relay SR, conductor 145, contact members c of relay 3, conductors 146, 126 and 127, contact members d of up-direction switch 1, conductor 128, the coils of inductor relays 2LU and 1LU in parallel, and conductors 130 and 131 to line conductor L2.

As the car continues in the upward direction and brings the inductor relay SR opposite its associated inductor plate SR', the armature of the relay SR is actuated to open the contact members 73, thereby interrupting the circuit to the coil 65 of up-direction switch 1. The opening of up-direction switch 1 interrupts the circuit to the generator field winding and the brake (not shown) which therefore operates to bring the car to rest. This last operation takes place when the car is moving at a rate of, for example, about 20 to 30 feet per minute. A variation in the speed of the car of even 1 or 2 feet per minute, therefore, makes a proportionately large difference in the speed of the car at this time, and, unless corrected, leads to stoppage of the elevator car at points other than level with the floor.

The value of my invention, therefore, becomes particularly apparent at this point in the operation of the elevator car, since the vibrating action of the member 13 with respect to the resistor 8 so controls the field of the generator G as to cause the speed of the elevator motor EM to be a predetermined value at the time the brake (not shown) is set to bring the car to a stop.

The action of the device is of value when the car is running at full speed, as described hereinbefore, since the field of the generator is so controlled as to cause the speed of the elevator motor to be of a predetermined value upon initiation of deceleration, thereby conditioning the car to follow the prescribed curve in decelerating.

The opening of contact members $d$ on up-direction switch, it will be noted, interrupts the circuits to the coils of all of the inductor relays.

The opening of the contact members 73 of stopping inductor relay SR also interrupts the circuit to the coil 68 of the latching device 69, movement of which is restrained, however, until the drum 25 has revolved to such a point that the device 69 can engage the latch portion 88 of the drum 25. It will be remembered that the coil 119 of latching device 120 is deenergized when the contact member 62 leaves the contact member 106 of the car switch Cs, but that this latching device has no effect on the movement of the drum 25 when rotating in the clockwise direction, since it rides over the latch portion 88 of the drum 25.

As previously described, the voltage relay 6 remains in the actuated position until the generator voltage drops to a value corresponding to an elevator motor speed lower than the slow running speed. Therefore, the circuit to the cam motor EM is maintained until after the latching device 69 engages the latch portion 88 of the drum 25, but is interrupted shortly thereafter in order that the motor CM may not consume power while the elevator car is standing at a floor. It will be apparent that when the latching device 69 has engaged the latch portion 88 of the drum 25, motion of this drum under the influence of the spring 89 is restrained until such a time as the elevator car is again started.

Through this arrangement, then, while the car is standing at a floor, both the member 13 and the resistor 8 are in their lowest positions. When, however, the elevator car is started in either direction, the latching device 69 is retracted to permit the spring 89 to change the position of resistor 8 in substantial synchronism with the change in position of the element 13, caused by the change in speed of the elevator car.

In an elevator system having an operating speed as high as six hundred feet per minute, such as I have illustrated, it is possible to accelerate the car to full speed only if a movement of two or more floors is contemplated, since it requires approximately the distance between two successive floors to either accelerate the car to full speed, or to decelerate it from full speed. If, then, it is desired to make stops at successive floors, the car must be accelerated to only its intermediate speed. In this event, the motion of the element 13 will be restricted and it is necessary to correspondingly limit the movement of the resistor 8. I accomplish this by limiting the rotation of the drum 25 to a position determined by the latching device 120.

It will be remembered that the coil 119 of latching device 120 is not energized until such a time as the car switch Cs is moved to its extreme position. Therefore, if the car switch Cs is moved to a position to accelerate the car only to its intermediate speed, this coil will not be energized and, as a consequence, when the drum 25 has rotated to such an extent that the latch portion 88 thereof is engaged by the latching device 120, further movement of the drum 25 and, hence, of the resistor 8 is restrained.

The regulating action obtained through the device 7 when the car is running at full speed is, therefore, obtained precisely in the same manner when the car is operating at intermediate speed.

To bring the car to a stop from intermediate speed, the operator, of course, centers the car switch as described before, and, at predetermined intervals, through the action of inductor relays 1LU and SR the car is decelerated and brought to a stop by the deenergization of relay 3 and of up-direction switch 1, and setting of the brake (not shown).

In this operation it is necessary that it be possible to energize the cam motor CM at the time at which the relay 3 is deenergized. I have provided, therefore, a second circuit for the motor CM extending from line conductor L1 to line conductor 126, as previously described, thence through conductor 147, the contact members of voltage relay 5, conductor 148, the normally closed contact members $d$ of relay 3, conductor 149 and thence through conductor 134, as previously described. The coil of relay 5 is energized by way of the same circuit through which relay 6 is energized, but is operably responsive to a voltage corresponding to an elevator speed slightly lower than intermediate speed. If the elevator is decelerated from high speed therefore, the motor CM is controlled by the relays 4 and 6, and, if decelerated only from intermediate speed, is controlled by relays 3 and 5.

Therefore, the motor CM starts to revolve the drum 25 as soon as relay 3 is deenergized through the action of inductor relay 1LU.

Since operation in the down-direction is in all respects similar to operation in the up-direction, with the exception that down-direction switch 2 replaces up-direction switch 1, that the inductor relays 2LD and 1LD replace inductor relay 2LU and 1LU, and the car switch Cs is moved in the clockwise direction instead of the counter-clockwise direction, it is not believed necessary to describe such operation in detail.

It will be seen from the described embodiment of my invention, that I have provided a motor controlling device whereby any variation from a predetermined running speed of a motor may be utilized to correct for such variation, and cause the motor speed to return to the predetermined value. As described, the device may be employed under conditions of desired constant speed, and may also be employed under conditions of desired variation in speed according to any prescribed schedule of variation. Through my invention, therefore, it is possible to attain a very precise motor regulation during all conditions of operation.

It is to be understood that the present embodiment is merely illustrative, and that I do not desire to be limited to the details thereof except as defined in the appended claims.

I claim as my invention:

1. In a control system for an elevator car, motive means for said car operable to cause said car to accelerate from zero speed to an intermediate speed, and from said intermediate speed to a higher speed, and to decelerate from said intermediate speed and said higher speed to zero speed, means for controlling said motive means, means operable from one position to another position in accordance with a predetermined rate at which said car should decelerate from said higher speed to zero speed, and operable between an intermediate position and said other position in accordance with a predetermined rate at which said car should decelerate from said intermediate speed to zero speed, means operable to return said operable means past said intermediate position to said first position after said deceleration period, means operable in accordance with the actual rate at which said car decelerates for cooperating with said first named operable means when said predetermined rate and said actual rate differ to cause said control means to vary said actual rate to decrease said difference, restraining means operable when said control means are actuated to cause said car to accelerate to said intermediate speed to prevent said returning means from moving said first named operable means past said intermediate position, and means operable upon movement of said control means to accelerate said car to said higher speed to render said restraining means ineffective.

2. In a motor-control system, a motor, a source of power for driving said motor, switching control devices for controlling said source to effect a predetermined rate of change of the speed of said motor, in combination with a regulating device comprising two cooperating elements, means defining predetermined paths of movement for each of said elements, means for determining the position on the associated path of one of said elements in accordance with the actual speed of said motor, means for causing movement of the other of said elements along the associated path at a rate proportional to said predetermined rate of change of speed of said motor, and switching mechanism controlled in accordance with the relative positions of said two elements and effective, in the event that the actual rate of change of speed of said motor differs from said predetermined rate, to control said source to reduce said difference.

3. In a motor-control system, a motor, a source of power for driving said motor, switching control devices for controlling said source to effect a predetermined rate of change of the speed of said motor, in combination with a regulating device comprising two cooperating elements, means defining predetermined paths of movement for each of said elements, means for determining the position on the associated path of one of said elements in accordance with the actual speed of said motor, means for causing movement of the other of said elements along the associated path at a rate proportional to said predetermined rate of change of speed of said motor, switching mechanism controlled in accordance with the relative positions of said two elements and effective, in the event that the actual rate of change of speed of said motor differs from said predetermined rate, to control said source to reduce said difference, and means responsive to the actuation of said control devices for rendering the moving means for said other element effective.

4. In a control system for an elevator, a hoist motor for said elevator, a source of power for said motor comprising a supply generator having field magnets, electrical connections between said motor and said generator, control means operable to control the excitation of said field magnets to effect a predetermined rate of change of the speed of said motor, said control means comprising a regulating device having an element operable in accordance with said predetermined rate of change of motor speed, a second element operable in accordance with the actual rate of change of motor speed, switching mechanism controlled by both of said two elements and operable, in the event said actual and predetermined rates differ, to vary the excitation of said field magnets to reduce said difference, means responsive to the position of said elevator, and selectively operable means to render said control means responsive to said position responsive means.

5. In a control system for an elevator, a hoist motor for said elevator, a source of power for driving said motor comprising a generator having field magnets, electrical connections between said motor and said generator, control devices actuable to vary the excitation of said field magnets to effect a predetermined rate of change of the speed of said motor, comprising a regulating device having two relatively movable elements, means for operating one of said elements at a rate proportional to said predetermined rate of change of motor speed, means for operating the other of said two elements at a rate proportional to the actual rate of change of motor speed, switching mechanism controlled in accordance with the relative positions of said two elements and effective, in the event that said actual and predetermined rates differ, to vary the excitation of said field magnets to reduce said difference, means responsive to the position of said elevator and means responsive to the actuation of said control devices for rendering said first named operating means responsive to said position responsive means.

6. In a control system for a motor, a source of power for driving said motor comprising a generator having field windings, electrical connections between said motor and said generator, a circuit for said field windings, a plurality of sections of resistance, and switching mechanism operable to sequentially include certain of said sections of resistance in the circuit of said field winding to reduce the speed of said motor at a predetermined rate, in combination with a regulating device having two cooperating elements, means for controlling one of said elements in accordance with the actual rate of change of the speed of said motor, means for controlling the other of said elements in accordance with said predetermined rate, and means controlled by both of said two elements and effective, in the event that said actual and predetermined rates differ, to include or exclude others of said sections of resistance in and from said circuit to thereby maintain said actual rate at substantially said predetermined value.

7. In a control system for an elevator car operable past a floor landing, a hoisting motor operatively connected to said car, a source of power for driving said motor comprising a generator having field magnets, electrical connections between said motor and said generator, means to control the excitation of said field magnets to control the speed of movement of said elevator car comprising switching mechanism sequentially operable as said car approaches said floor to gradually reduce the excitation of said field magnets to cause said car to retard at a predetermined rate and stop accurately level with said floor, in combination with a regulator having two cooperating elements, means to control one of said elements in accordance with the actual rate of retardation of said elevator car, means to control the other of said elements in accordance with said predetermined rate of retardation of said car, and switching mechanism controlled by both of said two elements and effective, in the event that said actual and predetermined rates differ, to vary the excitation of said field magnets to reduce said difference.

8. In a control system for a motor, a source of power for driving said motor comprising a supply generator having field magnets, electrical connections between said motor and said generator, and switching mechanism operable to vary the excitation of said field magnets at a predetermined rate to vary the speed of said motor at a corresponding rate, in combination with a regulator effective to maintain said rate of change of motor speed at substantially said predetermined value, said regulator comprising two cooperating elements, means for controlling one of said elements in accordance with the actual rate of change of motor speed, means for controlling the other of said elements in accordance with said predetermined rate of change of motor speed, and switching means controlled by both of said two elements, and effective, in the event that said actual rate exceeds said predetermined rate, to temporarily vary the excitation of said field magnets by an amount sufficient to reduce said actual rate to a value lower than said predetermined rate, and effective, in the event that said predetermined rate exceeds said actual rate, to temporarily vary the excitation of said field magnets by an amount sufficient to increase said actual rate to a value higher than said predetermined rate.

9. In a control system for an elevator car operable in a hatchway, a motor for moving said car, a source of power for said motor, and control mechanism to control said source to decelerate said motor and to cause the speed of said motor, during deceleration, to follow a predetermined succession of values with respect to the travel of said car in said hatchway, said control means comprising a regulator, means for differentially controlling said regulator in accordance with the actual speed of said motor and said predetermined succession of values, said regulator being effective, in the event the actual speed of said motor differs from said predetermined succession of values, to control said source to reduce said difference, and means comprising a control switch operable to render said control mechanism effective.

10. In a control system for an elevator car operable in a hatchway past a plurality of floors, a motor for said car, a source of power for said motor comprising a generator having field windings, and slow-down mechanism to control the excitation of said field windings to decelerate said motor and to cause the speed of said motor, during deceleration, to follow a predetermined succession of values with respect to the travel of said car in said hatchway, said means comprising a regulator, means for differentially controlling said regulator in accordance with said succession of values of motor speed and the actual speed of said motor, said regulator being effective, in the event the actual speed of said motor differs from said predetermined succession of values, to vary the excitation of said field windings to reduce said difference, and means comprising a selectively operable control switch for rendering said slow-down mechanism effective to decelerate said motor upon the approach of said elevator to any of said floors.

11. In a control system for an elevator car operable past a plurality of floors, a motor for moving said elevator, a generator for supplying power to said motor, means to control the excitation of said generator to cause said motor to stop said car at any of said floors, and to cause the speed of said motor, during deceleration, to pass through a predetermined succession of values with respect to the position of said car in advance of said floor, comprising regulating means having two cooperating elements, means for controlling one of said elements in accordance with the actual speed of said motor, means for controlling the other of said two elements in accordance with said predetermined succession of values of motor speed, means controlled by both said elements, and effective, in the event the actual speed of said motor differs from said predetermined succession to vary the excitation of said generator to reduce said difference, and selectively operable means to render said first named control means effective to cause said car to stop at any selected one of said floors.

12. In a control system for an elevator car operable past a floor, a motor for moving said elevator, a generator for supplying power to said motor, slow-down mechanism to control the excitation of said generator to cause said motor to stop said car at said floor, and to cause the speed of said motor, during deceleration, to pass through a predetermined succession of values with respect to the position of said car in advance of said floor, comprising regulating means having two cooperating elements, means for controlling one of said elements in accordance with actual speed of said motor, means for controlling the other of said two elements, in accordance with said predetermined succession of values of motor speed, and means controlled by both said elements, and effective, in the event the actual speed of said motor differs from said predetermined succession to vary the excitation of said generator to reduce said difference, means responsive to the position of said car with respect to said floor, and selectively operable means for rendering said slow-down mechanism responsive to said position responsive means.

13. In a control system for a motor, a source of power for driving said motor comprising a generator having field windings, electrical connections between said motor and said generator, a circuit for said field windings, a plurality of sections of resistance associated with said circuit, and switching mechanism operable to control said resistance to vary the excitation of said field windings to reduce the speed of said motor at a predetermined rate, in combination with a regulating device having two cooperating elements, means for controlling one of said elements solely in accordance with the actual rate of change of the speed of said motor, means for controlling the other of said elements in accordance with said predetermined rate, and means controlled by both of said two elements and effective, in the event that said actual and predetermined rates differ, to further vary the excitation of said field windings to thereby maintain said actual rate at substantially said predetermined value.

14. A control system for an elevator car comprising a hoisting motor; a generator for supplying power to said motor; control means for said generator comprising a pilot motor; means responsive to the position of said car for actuating said control means to cause said generator to decelerate said hoisting motor, said last named means comprising means to start said pilot motor.

15. A control system for an elevator car comprising a hoisting motor; a generator for supplying power to said motor; control means for said generator comprising regulating mechanism disposed to control the rate of change of speed of said motor; a pilot motor associated with said regulator; means responsive to the position of said car for actuating said control means to decelerate said motor, said last named means comprising means to start said pilot motor.

JAMES DUNLOP.